No. 652,155. Patented June 19, 1900.
T. R. WINGROVE.
APPARATUS FOR PURIFYING WATER.
(Application filed Sept. 16, 1899.)
(No Model.) 3 Sheets—Sheet 1.
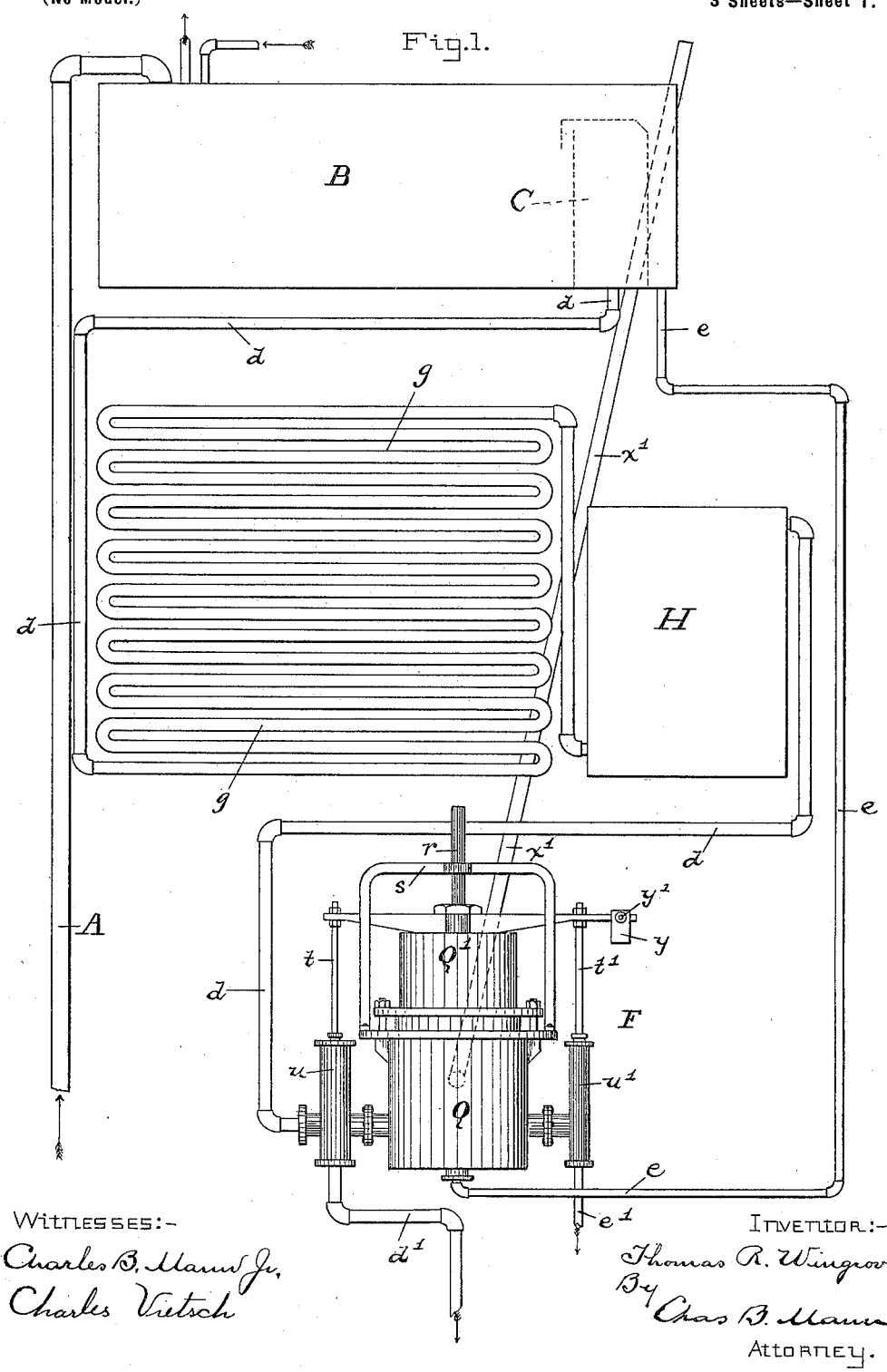

No. 652,155. Patented June 19, 1900.
T. R. WINGROVE.
APPARATUS FOR PURIFYING WATER.
(Application filed Sept. 16, 1899.)
(No Model.) 3 Sheets—Sheet 2.
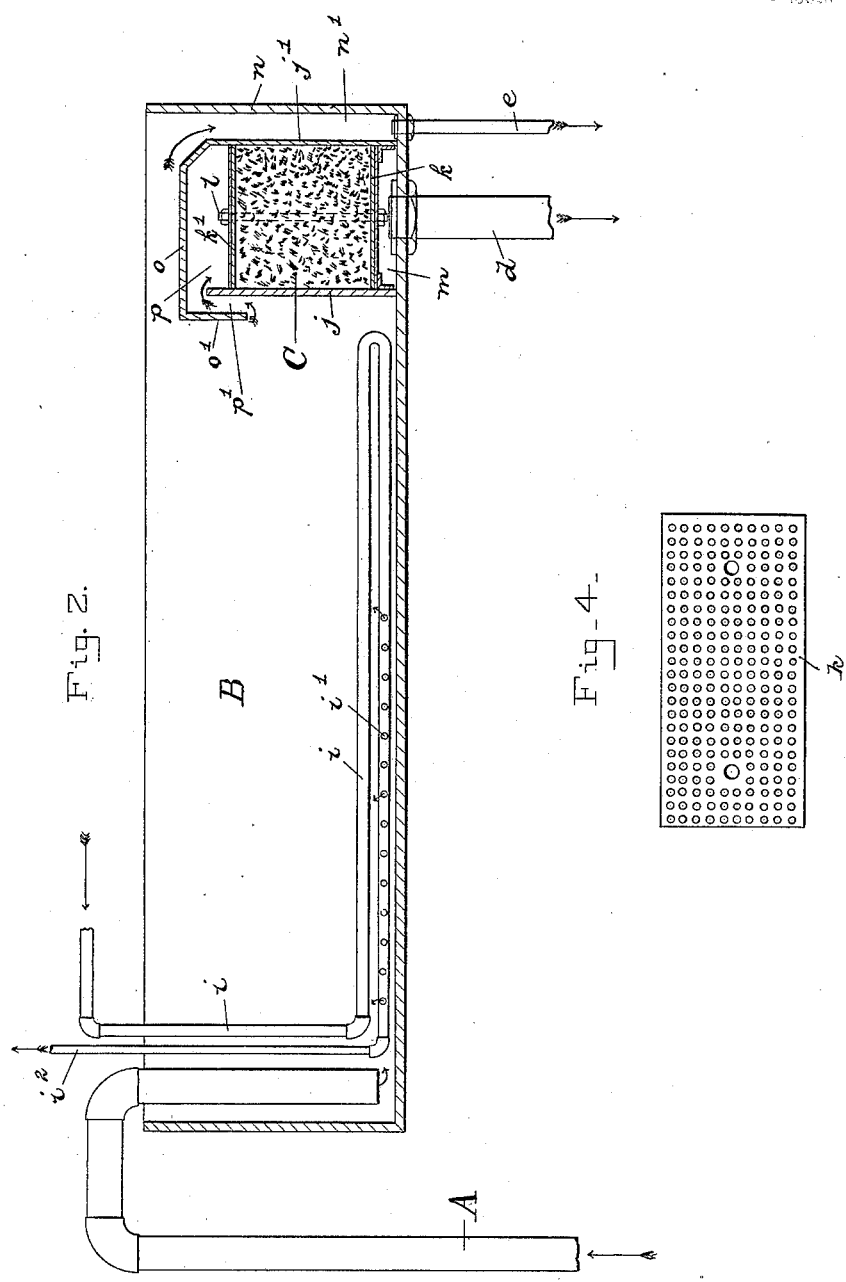

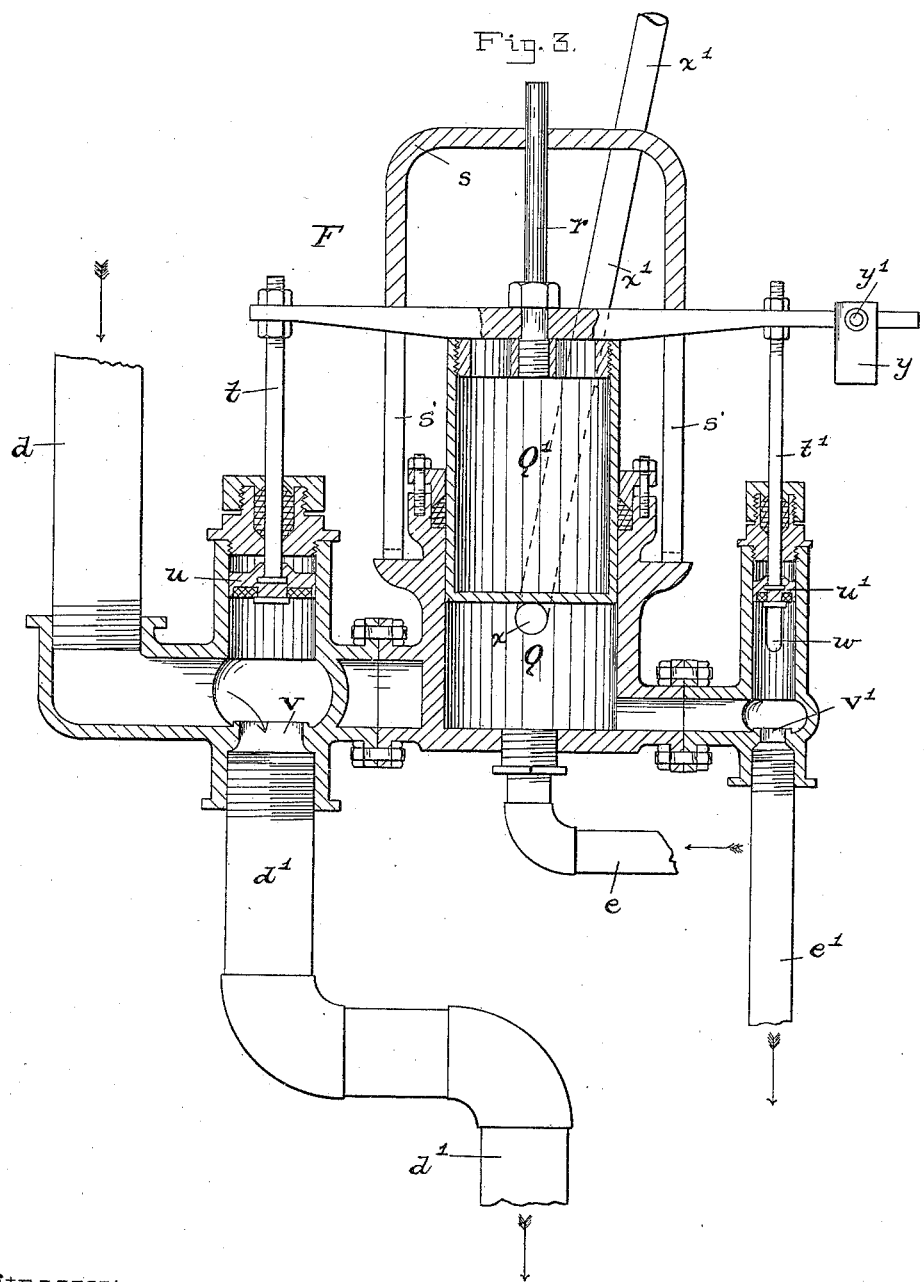

UNITED STATES PATENT OFFICE.

THOMAS R. WINGROVE, OF BALTIMORE, MARYLAND.

APPARATUS FOR PURIFYING WATER.

SPECIFICATION forming part of Letters Patent No. 652,155, dated June 19, 1900.

Application filed September 16, 1899. Serial No. 730,725. (No model.)

*To all whom it may concern:*

Be it known that I, THOMAS R. WINGROVE, a citizen of the United States, residing at Baltimore, in the State of Maryland, have invented certain new and useful Improvements in Apparatus for Purifying Water, of which the following is a specification.

This invention relates to an apparatus for purifying water for ice-making machines, boiler-feed, and other purposes.

The object of the invention is to provide for purifying the water of condensed steam, which contains oil and other impurities, so as to render such water fit for conversion into ice.

In the accompanying drawings, Figure 1 is a diagram in elevation showing the several parts of the apparatus connected together. Fig. 2 is a vertical section of the boiling-tank, filter, and skimming device. Fig. 3 is a vertical section of the regulator. Fig. 4 is a plan of the perforated filter-plate.

The letter A designates a water-pipe from a steam-condenser; B, a tank for boiling the water. The end A' of the water-pipe preferably projects down into the tank to a point near its bottom. A filter C is connected with the tank. A pipe $d$ for pure water leads from the filter, and said pipe finally connects with the regulator F. The tank has an overflow device or skimmer, and a pipe $e$ for the skimmed impure water leads from the skimmer to the regulator. In the present instance a coil of pipe $g$, serving as a cooler, and also a second filter H are interposed in the line of pure-water pipe $d$.

The tank B contains pipe $i$, arranged in two coils on the bottom of the tank, and one or more pipes of the lower series of coils has perforations $i'$. Steam from a boiler circulates through these coils, and thus the water in the tank B and which is undergoing the purifying process is heated and boiled, and steam escaping from the perforations agitates the water. An upright pipe $i^2$, with its upper end open, leads from the lower coils and serves as an outlet for any steam or gas that does not escape at the perforations $i'$. At the discharge end the tank has a bulkhead or wall $j$, which fits tight to the bottom and to the two side walls. A second tight bulkhead or wall $j'$ is parallel with the first one, and the space between the two is packed with suitable material to act as a filter C, before mentioned. This filter has a bottom plate $k$, containing perforations, and also a perforated top plate $k'$, and a vertical bolt $l$ passes through both plates and holds them in position. Below the filter is a space $m$, from which the pure-water pipe $d$ leads, and between the second bulkhead or wall $j'$ and end $n$ of the tank is a space or chamber $n'$ for the skimmings or impure water, and the pipe $e$ leads from this chamber.

A hood $o$ covers the filter C, being united tightly to the top of the second bulkhead $j'$ and extending therefrom over the filter and above the top of the first bulkhead $j$, leaving an overflow-space $p$ onto the filter and having a downward-projecting flange or baffle-plate $o'$ in front of the said overflow-space. By this construction the oil and light impurities contained in the heated water that is being treated will rise to the top and will be skimmed off or flow over the hood $o$ and into the chamber $n'$ and thence out through impure-water pipe $e$ to the regulator. The heated water below the baffle-plate $o'$ will rise in the space $p'$, adjoining the bulkhead $j$, and overflow through the space $p$ onto the top plate of the filter and pass down through the filter to space $m$ and then out through pure-water pipe $d$. As already indicated, this water next may go to a cooler $g$ and to another filter H and then to the regulator, or obviously might go direct from the first filter C to the regulator, the cooler and second filter being omitted.

The regulator F controls the operation of the two kinds of water that leaves the boiling-tank B and insures that the water containing the oil and light impurities will flow over the hood $o$ and discharge through a pipe, while the purified water that is freed of oil will discharge through a different pipe. The regulator comprises an upright cylinder Q, having a hollow piston Q', which reciprocates within it. The impure-water pipe $e$ extends downward from the tank B and connects with the cylinder below the piston in order that the pressure exerted on the piston by the weight of water standing in the upright pipe $e$ will raise the piston Q'. A stem $r$ is attached to the piston and projects up and moves through an eye in a yoke $s$ and serves to guide the piston. A beam or cross-head of suitable kind is connected with the piston Q' and also with two valve-stems $t\ t'$, which actuate valves $u\ u'$. The cross-head is guided by vertical slots $s'$ in the yoke. The first valve $u$ controls the purified water flowing through pipe $d$ and when closed insures that the tank B will fill to overflow the hood $o$, and the second valve controls the impure water which wastes from the cylinder, and the joint operation of these two valves is such as to insure the proper operation of the purifying-tank B. The port $v'$ of the waste-water valve $u'$ is much smaller than the port $v$ of the pure-water valve, and the waste-water valve $u'$ also has a stem $w$ depending below it, which when the valve is seated projects down through the port $v'$ and partly fills it. When this valve begins to lift or to unseat, the depending stem still remains in the port $v'$ and partly chokes it, so that the impure water in the cylinder Q is allowed to discharge, but only very slowly, until the piston Q' has raised far enough to entirely withdraw the depending stem $w$ from port $v'$, thereby affording time for the larger quantity of pure water in the pipe $d$ to flow out through the open port $v$ to the pipe $d'$, which leads to a receiver. (Not shown.) The impure water that discharges through the port $v'$ and pipe $e'$ goes to waste in a drain or to any suitable place. The cylinder Q has an air-vent hole $x$, to which is attached a stand-pipe $x'$, whose upper end is as high as the purifying-tank B. This air-vent provides for the escape of air from below the piston, and thereby insures that there will be no air present to hinder downward movement of the piston and the closing of both valves. As the waste-water valve $u'$ is smaller and lighter than the other valve, a weight $y$ is attached to the beam or cross-head at the end where the stem $t'$ of this valve is connected. This weight has a set-screw $y'$, which holds the weight wherever set on the beam.

Now the operation of the apparatus is as follows: Water from a steam-condenser or other source of supply passes from pipe A into the tank B. Steam from a boiler circulates through the coils $i$ in the tank. Also a few steam-jets issue from the perforations $i'$, and these jets agitate the water and also assist to heat it. The water will fill the tank after the pipe $d$ becomes filled, because valve $u$ is closed. The oil and light impurities will now rise to the surface in the tank and flow over the hood $o$, and the water freed from these impurities passes up space $p'$ and over the bulkhead $j$, then through the filter C, and thence through pipe $d$ to the closed valve $u$ in the regulator. The water skimmed by flowing over the hood $o$ enters the chamber $n'$ and then passes through the stand-pipe $e$ into the piston-chamber Q. As soon as this stand-pipe is full of water sufficient pressure will thereby be created to raise the piston Q', which opens both valves $u\ u'$. The pure water in pipe $d$ will have ample time to discharge, because this valve $u$ will be retained open for a sufficient period by the comparatively-slower discharge of the impure water through the choked port $v'$. When, however, the impure water in the cylinder has been discharged, the piston Q' will lower, and thereby both valves will be seated. While these valve movements have been going on, the water in the tank B maintains its position to the top of hood $o$. Were the regulator absent and the discharge water-pipe $d$ open the water filling into the tank would never rise high enough to overflow the hood $o$, and the skimming operation would not result.

The operation is automatic entirely, and the piston and two valves will alternately raise and lower with a degree of speed in unison with the speed of water flowing into the tank by pipe A.

Having thus described my invention, what I claim as new, and desire to secure by Letters Patent, is—

1. In a water-purifying apparatus the combination of a water-boiler tank having two bulkheads tightly fitting the bottom and two side walls intermediate of its two ends and forming between the two bulkheads a space and between one bulkhead and one end a second space; a hood covering the space between the two bulkheads and having on the tank side a downward-projecting flange or baffle-plate which leaves a space below its lower edge for pure water to enter and overflow the first bulkhead—said hood serving also as a skimmer over which the surface water will flow; a pure-water pipe leading from the space between the two bulkheads; an impure-water pipe leading from the second space; and an automatic regulator having valves and with which the said two pipes which lead from the said spaces connect, as set forth.

2. In a water-purifying apparatus the combination of a water-boiler tank having two bulkheads tightly fitting the bottom and two side walls intermediate of its two ends and forming between the two bulkheads a space and between one bulkhead and one end a second space; a hood covering the space between the two bulkheads and having on the tank side a downward-projecting flange or baffle-plate which leaves a space below its lower edge for pure water to enter and overflow the first bulkhead—said hood serving also as a skimmer over which the surface water will flow; a cylinder with a piston and having a waste-water pipe provided with a valve; a stand-pipe for impure water leading from the second space in the tank to the cylinder; a pure-water pipe leading from the space between the two bulkheads and provided with a valve; and a connection between the said piston and the said two valves.

3. A tank for water-purifying apparatus said tank having a bulkhead tightly fitting its bottom and side walls and forming a space which is separated from the main body of the tank; a hood above the top of the bulkhead and covering the said space and having on the tank side a downward-projecting flange or baffle-plate which leaves a space below its lower edge and adjoining the bulkhead for the entrance of pure water which will overflow the bulkhead and enter the space, said hood also serving as a skimmer over which will flow the impurities on the surface of the water; a pure-water pipe leading from said space, and an outlet for the impure water that flows over the hood.

4. In a water-purifying apparatus the combination of a tank said tank having a bulkhead tightly fitting its bottom and side walls and forming a space which is separated from the main body of the tank; a filter in said space; a hood above the bulkhead and filter and provided with a downward-projecting flange or baffle-plate adjoining the bulkhead but leaving a passage for water; a pure-water pipe leading from the filter, and an outlet for impure water that flows over the hood.

5. The combination of an upright cylinder with a piston; two valve-cases each having a piston-valve, one to discharge pure and the other impure water; an impure-water passage leading from the said cylinder to one of the valves; a cross-head carried by the piston, and an independent stem connecting each piston-valve with said cross-head.

6. The combination of an upright cylinder with a piston said cylinder having two valve-cases attached, one diametrically opposite the other and one valve-case having a waste-passage communicating with the cylinder; a puppet-valve, $u'$, in the waste-valve case, said valve having a depending stem, $w$, which projects through its port and partly fills it; a pure-water valve in the other valve-case; and a cross-head carried by the piston and connected with both of said valves.

7. In a water-purifying apparatus the combination of a water-tank provided with means to separate the oil and light impurities from the water; an upright cylinder with a piston and provided with a waste-water pipe having a valve; a pipe for impure water leading from said tank to the cylinder below the piston; a pipe for pure water leading from said tank and having a valve; and a suitable cross-head carried by the piston and connected with said two valves, whereby the raising and lowering of the piston will open and close both valves.

In testimony whereof I affix my signature in the presence of two witnesses.

THOMAS R. WINGROVE.

Witnesses:
CHARLES B. MANN, Jr.,
CHARLES VIETSCH.